United States Patent
Uranaka et al.

(10) Patent No.: US 6,823,774 B2
(45) Date of Patent: Nov. 30, 2004

(54) FRESHNESS PRESERVING GADGET

(75) Inventors: Ushio Uranaka, Tokyo (JP); Kouji Nishizaki, Tokyo (JP); Yosuke Akiba, deceased, late of Tokyo (JP); by Itsuko Akiba, legal representative, Tokyo (JP)

(73) Assignee: Fretek Co., Ltd., Tokyo (JP)

( * ) Notice: Subject to any disclaimer, the term of this patent is extended or adjusted under 35 U.S.C. 154(b) by 585 days.

(21) Appl. No.: 09/869,307

(22) PCT Filed: Jan. 10, 2001

(86) PCT No.: PCT/JP01/00066

§ 371 (c)(1),
(2), (4) Date: Jul. 20, 2001

(87) PCT Pub. No.: WO01/50890

PCT Pub. Date: Jul. 19, 2001

(65) Prior Publication Data

US 2002/0175218 A1 Nov. 28, 2002

(30) Foreign Application Priority Data

Jan. 14, 2000 (JP) .......................................... 2000-7065

(51) Int. Cl.$^7$ .............................................. B65D 81/26
(52) U.S. Cl. ......................... 99/467; 99/473; 426/118; 426/124; 426/316; 422/28; 422/32
(58) Field of Search .......................... 99/467, 473, 482; 426/118, 124, 316, 324, 326, 395; 422/40, 28, 29, 32

(56) References Cited

U.S. PATENT DOCUMENTS

| 4,802,574 A | 2/1989 | Akiba |
| 5,126,109 A | 6/1992 | Saitoh |

FOREIGN PATENT DOCUMENTS

| EP | 0 320 076 | 6/1989 |
| JP | 4-212840 | 8/1992 |
| JP | 6-39971 | 2/1994 |
| JP | 7-17576 | 1/1995 |
| JP | 8-294380 | 11/1996 |
| JP | 9-86544 | 3/1997 |
| JP | 11-32743 | 2/1999 |

Primary Examiner—Reginald L. Alexander
(74) Attorney, Agent, or Firm—Oblon, Spivak, McClelland, Maier & Neustadt, P.C.

(57) ABSTRACT

An adsorbent (2) is sandwiched by two films (4) from upper and lower directions; the two films (4) are bonded to upper and lower surfaces of the adsorbent (2). A skirt portion (4A) extending in a lateral direction of the adsorbent (2) is formed in an outer periphery of each of the films (4) and dispersing openings (8) are formed between the skirt portions (4A). Then, a freshness-keeping liquid impregnated in the adsorbent (2) is gradually dispersed outside from each side portion (2A) of the adsorbent (2) through the dispersing opening (8), whereby the adsorbent (2) in the freshness-keeping device (1) is prevented from contacting directly food and the freshness of the food can be kept stably in a long period of time.

16 Claims, 13 Drawing Sheets

FRESHNESS PRESERVING GADGET

BACKGROUND OF THE INVENTION

The present invention relates to a freshness-keeping device used preferably for preserving food such as, for example, fresh food, cakes or the like for a long period of time to keep the freshness.

TECHNICAL FIELD

Generally, a freshness-keeping device is used to keep the freshness of food or other material to be preserved (for example, decorations for food such as bamboo leaves, persimmon leaves or the like, leather articles, articles made of wood or bamboo, articles made of grass or straw or the like). Such freshness-keeping device is known in, for example, U.S. Pat. No. 4,802,574, JP-A-9-140363 and so on.

Such freshness-keeping device by conventional techniques is produced by, for example, impregnating a volatile freshness-keeping liquid including ethyl alcohol or the like as the main component into an adsorbent, and the adsorbent is formed by using natural pulp or the like in a form of rectangular flat plate-like shape or a small round rod-like piece.

For example, an adsorbent formed as a rectangular flat plate of 50 mm long, 30 mm wide and 2 mm thick, is covered at its upper and lower surfaces with a resinous film having a high impermeability to gas, and the freshness-keeping liquid held inside is gradually dispersed to the outside from only side surface portions of front and back directions and left and right directions.

Further, in an adsorbent of, for example, a round rod-like shape of 10 mm in diameter and 70 mm long, outer peripheral surfaces of the adsorbent are covered over the entire length with a resinous film having a high impermeability to gas, and a freshness-keeping liquid held inside is gradually dispersed outside from end portions at both ends in a direction of the length. In this case, the resinous film has a porous structure and such a treatment that the freshness-keeping liquid is gradually dispersed from the outer peripheral surfaces of the adsorbent, is conducted.

Such freshness-keeping device is used by putting it in a food packing body for a material such as fresh food, cakes or the like, and the freshness-keeping liquid in the adsorbent disperses gradually in the food packing body. Accordingly, the freshness-keeping device fills the space (head space) in the food packing body with a gaseous atmosphere for keeping the freshness, and the gas is adsorbed in a surface side of the food to thereby suppress an increase of bacterium such as mold.

Further, as another conventional technique (disclosed in, for example, JP-A-11-32743), an ethanol vapor generating sheet, a method of producing the same and a treating method for food are described. The ethanol vapor generating sheet by the other conventional technique has such a structure that a N-vinylcarboxylic acid amide series liquid absorbent containing ethanol or its aqueous solution is uniformly interposed between two envelope sheets at least one of which has ethanol vapor transmitting properties, four sides of the two envelope sheets are sealed by heat bonding in this state.

In the above-mentioned conventional techniques, however, a side surface and so on of the adsorbent of the freshness-keeping device in the food packing body may directly contact the food in the packing body whereby the freshness-keeping liquid in the adsorbent may be absorbed in the food in an early stage. Thus, there are problems that the service life of the freshness-keeping device decreases and discoloration of the food is caused to reduce the article value.

Further, in food containing much amount of fats and oils such as western cakes or the like, fats and oils in the food may be adsorbed in the adsorbent of the freshness-keeping device from its side face and so on. Accordingly, there are problems that the freshness-keeping device is discolored by the fats and oils of food adsorbed by the adsorbent, and a reduction of the quality of the outer appearance is resulted.

On the other hand, even in the ethanol vapor generating sheet by the above-mentioned another conventional technique, there may occur such problems that when the food or the like contacts directly an envelope sheet having ethanol vapor permeability, or when the food contacts a side edge portion of an envelope sheet, the ethanol or an aqueous solution thereof in the liquid absorbing agent is absorbed to the food in an early stage or the fats and oils in the food are absorbed into the liquid absorbing agent.

DISCLOSURE OF THE INVENTION

The present invention has been made in considering problems in the above-mentioned conventional techniques, and an object of the present invention is to provide a freshness-keeping device which prevents an adsorbent from contacting directly food or the like to keep the freshness of the food or the like in a stable manner for a long period of time.

Further, it is another object of the present invention to provide a freshness-keeping device capable of suppressing the absorption of fats and oils of food or the like in an adsorbent, thereby causing discoloration of the adsorbent and a reduction of the quality of the outer appearance, and capable of increasing the article value.

In the construction employed in the present invention in order to solve the above-mentioned problems, there is provided a freshness-keeping device for keeping the freshness of food or other material to be preserved, which comprises an adsorbent adsorbed with a volatile freshness-keeping liquid and a film cover made of a material having a high impermeability to gas of the freshness-keeping liquid, which has larger dimensions than the adsorbent to cover the adsorbent from the outside, wherein the cover has a skirt portion extending in a lateral direction of the adsorbent and a dispersing opening is formed at the skirt portion to permit the freshness-keeping liquid to gradually disperse outwardly from the adsorbent.

With such construction, the volatile freshness-keeping liquid adsorbed previously in the adsorbent gradually disperses from the dispersing opening formed at the skirt portions of the film cover to the outside, and the dispersing rate can be adjusted by the surface area of the opening. In this case, since the film cover has a high impermeability to gas volatilizing from the freshness-keeping liquid, there is no possibility that the freshness-keeping liquid in the adsorbent disperses from a portion other than the dispersing opening of the cover to the outside. Further, since the cover has the skirt portion having larger dimensions than the adsorbent to cover the adsorbent from the outside and extending in a lateral direction of the adsorbent, the direct contact of the adsorbent held inside to the food or the like can be prevented by the skirt portion of the cover, and the dispersing rate of the freshness-keeping liquid can correctly be kept by the dispersing opening.

Further, the present invention provides the construction that the extension dimension L of the skirt portion extending in a lateral direction of the adsorbent is larger than the thickness T of the adsorbent (L>T).

Further, the present invention provides the construction that the cover comprises a single or two films made of a material having a high impermeability each having larger dimensions than the adsorbent and having an outer periphery as the skirt portion extending in the lateral direction of the adsorbent in a state of sandwiching the adsorbent wherein the film or films secure the adsorbent by bonding upper and lower surfaces of the adsorbent in a state of sandwiching the adsorbent, and the skirt portions extend to an outer side of the adsorbent to provide a dispersing opening by being separated in upper and lower directions.

With such, the single or two films can hold the adsorbent in a state of sandwiching it, and each of the skirt portions is extended from the upper and lower surfaces of the adsorbent to an outer side with a space kept therebetween whereby the dispersing opening can be formed between them. Accordingly, the freshness-keeping liquid gradually disperses from side surfaces of the adsorbent sandwiched by the single or two films to the outside through the dispersing opening between the skirt portions, and the direct contact of the adsorbent to the food or the like can be prevented by the skirt portions.

Further, the present invention provides the construction that the cover comprises a single or two films made of a material having a high impermeability each having larger dimensions than the adsorbent and having an outer periphery as the skirt portion extending in a lateral direction of the adsorbent in a state of sandwiching the adsorbent, and a plurality of bond areas formed at the skirt portions, which are formed by bonding the skirt portions whereby the adsorbent is restricted between the film or films and wherein the dispersing opening is constituted by a non-bond area which is located between the bond areas between the skirt portions of the film or films.

With this, the single or two films are bonded at the plurality of bond areas formed at the skirt portions as the outer periphery; the bond areas can restrict the adsorbent in a state that the adsorbent is sandwiched between the films, and the adsorbent can be held at a position inside of the skirt portions of the films. Further, since the dispersing opening is provided by the non-bond area located between the bond areas between the skirt portions of the film or films, it is possible to gradually disperse the freshness-keeping liquid in the adsorbent to the outside through the dispersing opening.

Further, the present invention provides the construction that the adsorbent has a polygonal flat plate-like shape; the film or films have a shape corresponding to the shape of the adsorbent in which a plurality of corner portions are formed in the skirt portions and the bond areas are formed at at least two corner portions among the corner portions of the film or films.

With this, the bond areas can be formed at corner portions of a film having, for example, a rectangular shape, and at least two dispersing openings can be formed between each bond areas at the skirt portions of the film or films.

Further, the present invention provides the construction that the film or films have a rectangular shape having left and right sides being parallel to each other and the bond areas are formed at both the left and right sides. With this, the bond areas can be formed continuously at left and right sides of the film or films.

Further, the present invention provides the construction that the film or films are made of an elongated strip-like resinous film and adsorbents are arranged with intervals inside the elongated resinous film or films.

With this, a plurality of film or films can be formed by using an elongated resinous film, and the adsorbent can be received individually in the film or films formed by cutting the resinous film at predetermined intervals.

Further, according to the present invention, a plurality of cut lines are formed in the elongated resinous film at positions between individual adsorbents to define the film or films. With this, a plurality of film or films can be formed by using elongated resinous film or films in which it or they can be cut off at the positions of cutting lines, and the adsorbent can be received individually in the film or films which are defined by the cutting lines in the resinous film.

BEST MODE FOR CARRYING OUT THE INVENTION

Figure 1:
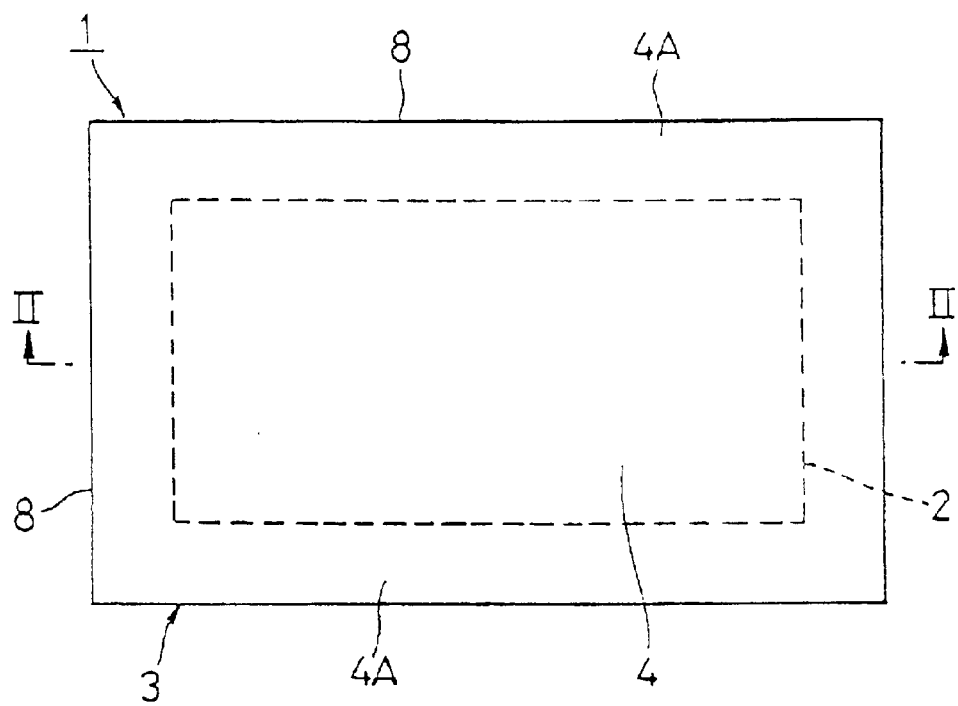
FIG. 1 is a front view showing the freshness-keeping device according to a first embodiment of the present invention.

In the following, the freshness-keeping device according to embodiments of the present invention will be described in detail with reference to the attached drawings by exemplifying a case that the device is used for preserving food.

FIGS. 1 to 4 show the first embodiment of the present invention. In Figures, numeral 1 designates a freshness-keeping device employed in this embodiment wherein the freshness-keeping device 1 comprises an adsorbent 2 which is described later and a cover 3 and so on. The cover 3 is composed of films 4, 4, described later, which cover the adsorbent 2 from both upper and lower surface sides.

Figure 2:
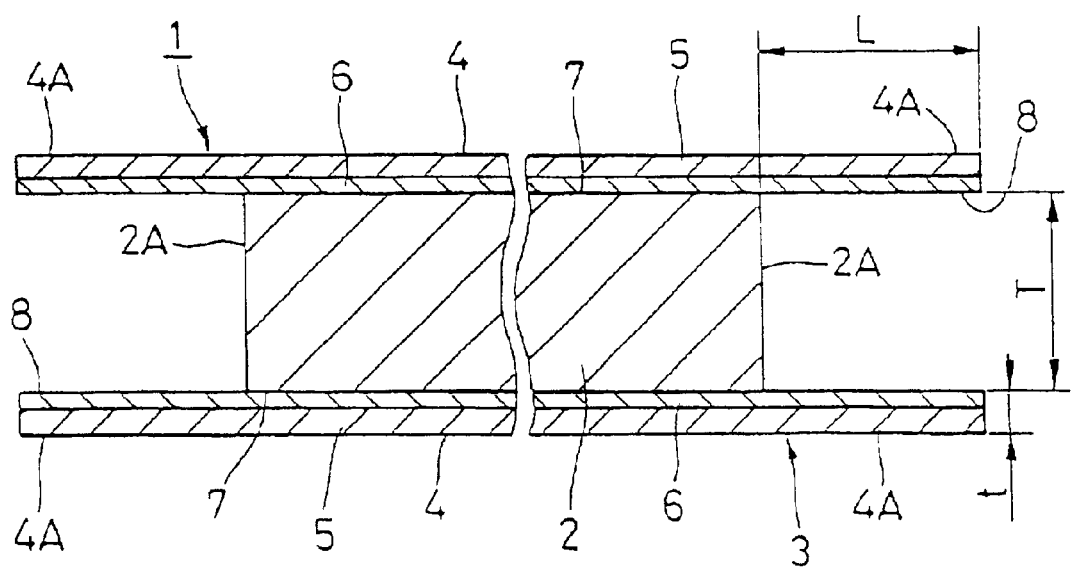
FIG. 2 is an enlarged cross-sectional view of the freshness-keeping device viewed from a direction of arrow marks II—II in FIG. 1.

Numeral 2 designates the adsorbent disposed between the films 4. The adsorbent 2 is formed in a rectangular flat-plate like shape by using a material of woven cloth, non-woven cloth or the like made of, for example, natural virgin pulp or polyolefin or the like subjected to adsorption/water absorption processes, and has a length of about 30–90 mm, a width of about 15–55 mm and a thickness T, as shown in FIG. 2, of about 1–2 mm, for example.

In the adsorbent 2, a volatile freshness-keeping liquid containing, for example, ethyl alcohol or the like as the main component is impregnated, and the freshness-keeping liquid is gradually dispersed from sides of side surfaces 2A of the adsorbent 2 to the outside through dispersing openings 8 which are described hereinafter.

The freshness-keeping liquid is a mixture of a freshness-keeping liquid A composed of modified ethyl alcohol, lactic acid, purified water and so on shown in the following Table 1 and a freshness-keeping liquid B composed of citrus series perfume.

TABLE 1

| Freshness-keeping liquid A | Material | Modified ethyl alcohol | Lactic acid | Purified water |
|---|---|---|---|---|
| | Weight ratio | 56–58% | 0.02–0.03% | Residual |
| Freshness-keeping liquid B | Material | Citrus series perfume | | |

The freshness-keeping liquid used as an example is a mixture having a volume ratio of the freshness-keeping liquid B to the freshness-keeping liquid A of B/A=(0.3/100)–(0.5/100).

In the freshness-keeping liquid A, fatty acid or the like having an antibacterial effect can be used instead of or together with the lactic acid.

Numeral 3 designates the film cover covering the adsorbent 2 from the outside. The cover 3 comprises two films 4, 4 interposing the adsorbent 2 from upper and lower sides in a sandwich form, and each of the films 4 is bonded to upper and lower surfaces of the adsorbent 2 at each bond area 7 which is described hereinafter.

Each of the films 4 is a thin sheet of rectangular shape having larger dimensions than the adsorbent 2, and its outer peripheral side is extended as a skirt portion 4A laterally from the adsorbent 2. The extension dimension L of the skirt portion 4A is about 4–6 mm, for example, which is larger in dimension than the thickness T of the adsorbent 2 (L>T).

In this case, the extension dimension L of the skirt portion 4A may have a dimension equal to the thickness T of the adsorbent 2 (L=T), or it is possible that the extension dimension L is smaller than the thickness T of the adsorbent 2 (L<T). However, when the extension dimension L of the skirt portion 4A is equal to the thickness T of the adsorbent 2 (L=T) or is smaller than that (L<T), there is apt to occur a possibility that the side surfaces 2A of the adsorbent 2 contact directly food or the like put in together.

Here, each film 4 has a three-layer structure comprising a film layer of high gas barrier properties 5 having a high impermeability to gas, which is formed by using, for example, a biaxially oriented polypropylene film (OPP film) or the like, a coating layer 6 using a special resin and a film printing layer (not shown) formed between the coating layer 6 and the film layer 5, wherein the coating layer 6 serves as an ink protecting layer for the film printing layer.

The film printing layer indicates thereon by printing, for example, a tradename, a ratio of components of the composition, a notice for use and so on by using an edible ink or a non-toxic ink. For this, the film layer 5 is composed of a resinous material having transparency. On the other hand, the coating layer 6 has functions of contacting closely to the pulp material of the adsorbent 2 and preventing the biting-off or decomposition by mastication if the adsorbent 2 is eaten erroneously. Further, the coating layer 6 is impregnated with perfume or the like for food, and it has function to gradually disperse the perfume outside.

The film 4 has the overall thickness t which is relatively thick, for example, a thickness of about 30–70 μm to thereby provide a certain degree of rigidity to the skirt portion 4A at an outer periphery side, whereby upper and lower skirt portions 4A, 4A are prevented from contacting to each other due to water drops or moisture or the like, for example.

As the material for the film layer 5 and the coating layer 6 constituting the films 4, a resinous film such as polypropylene other than the biaxially oriented polypropylene, polyvinylidene chloride, polyvinyl alcohol, polyacrylonitrile, polyester, polyethylene, stretched nylon or the like may be used.

Numerals 7, 7 designate the bond areas for fixing each of the films 4 on an upper or lower surface of the adsorbent 2, and each of the bond areas 7 is formed to extend over the entire surface area of an upper or lower surface of the adsorbent 2. For boding means, means such as pasting, thermocompression bonding and so on which are safe to food are used.

Figure 3:
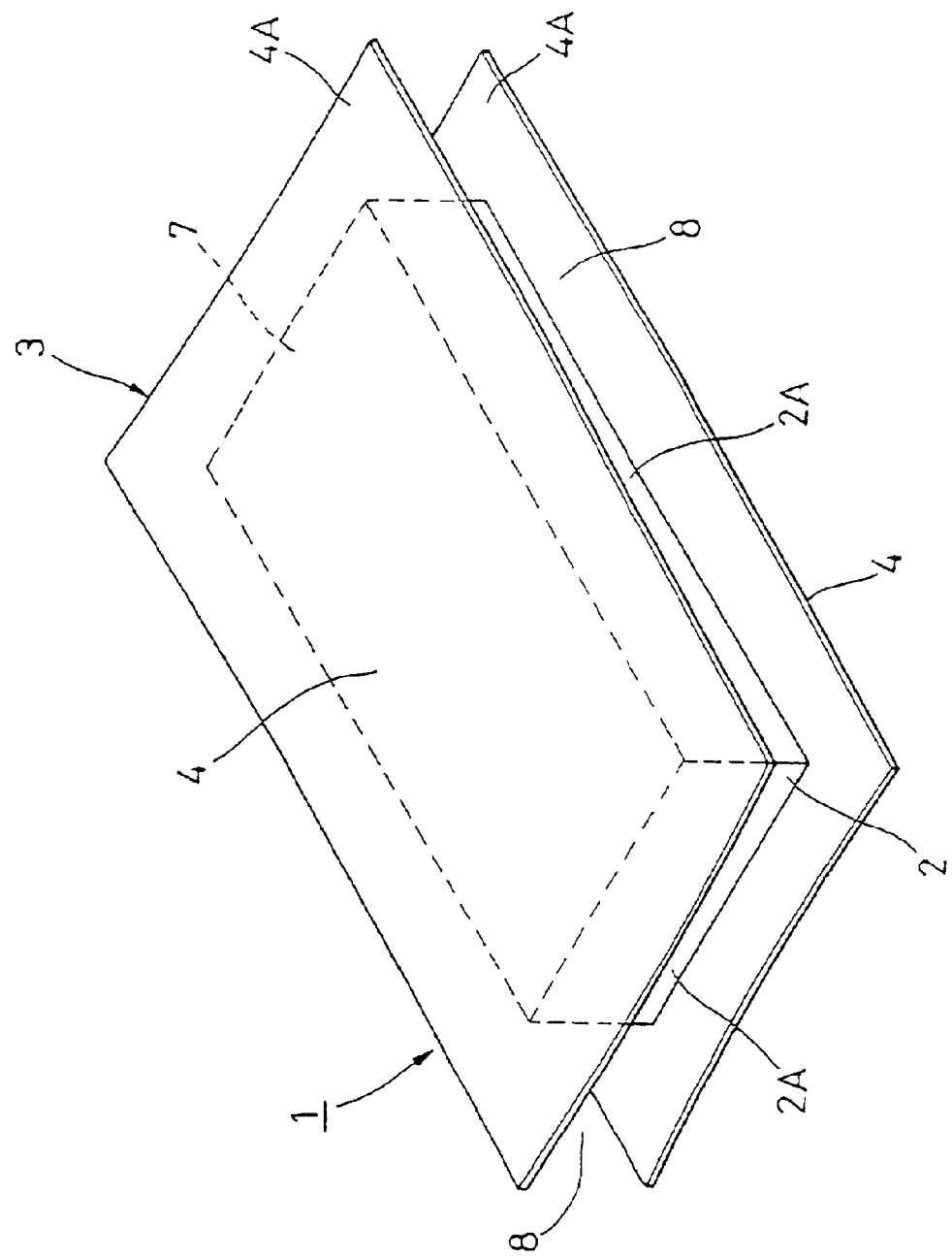
FIG. 3 is an enlarged perspective view of the freshness-keeping device in FIG. 1.

Numerals 8 designate the dispersing openings formed between skirt portions 8 of the films 4. The dispersing openings 8 are formed between the skirt portions 4A which are extended laterally from the adsorbent 2 and are apart from each other in upper and lower directions so that front, rear, left and right side surfaces 2A, 2A, . . . of the adsorbent 2 are communicated with outer air as shown in FIG. 3. Further, the dispersion openings 8 disperse the freshness-keeping liquid impregnated in the adsorbent 2 outside from each side surface 2A.

The freshness-keeping device 1 according to this embodiment has the above-mentioned construction. In the next, freshness-keeping operations of it will be described.

Figure 4:
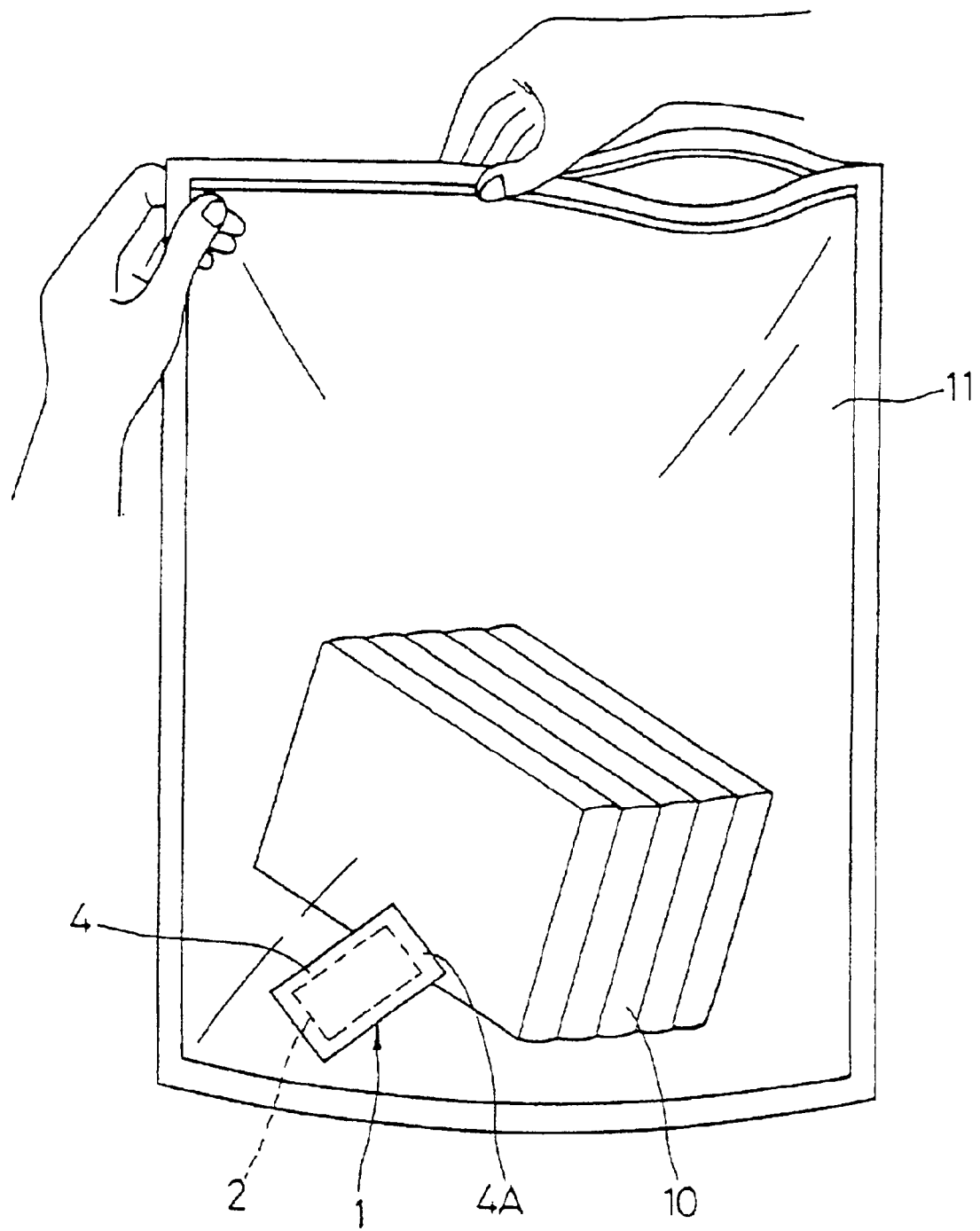
FIG. 4 is a perspective view showing a state of using the freshness-keeping device put in a food packing body.

In a case that food 10 such as sandwich or the like is to be preserved by sealing it in a food packing body 11 made of a transparent resinous bag, the freshness-keeping device 1 is previously put in the food packing body 11 as shown in FIG. 4.

The freshness-keeping liquid impregnated in the adsorbent 2 of the freshness-keeping device 1 gradually disperses in the food packing body 11 whereby the space (head space) in the food packing body 11 is filled with a gaseous atmosphere for keeping the freshness. Further, a part of volatile gas is adsorbed into a front layer side of the food 10. By such, the freshness of the food 10 in the food packing body 11 can be maintained for a long period of time, and an increase of bacterium such as mold for example can be suppressed.

In a case of using the freshness-keeping device 1 in the food packing body 11, there is a possibility that the freshness-keeping liquid in the adsorbent 2 is absorbed into the food 10 in an early stage by the direct contact of a side surface 2A of the adsorbent 2 with the food 10 in the packing body 11, whereby the service life of the freshness-keeping device 1 may decrease.

In this embodiment, the adsorbent 2 is sandwiched from upper and lower directions by using the two films 4, 4; the films 4, 4 are bonded to the upper and lower surfaces of the adsorbent 2, and at the same time, the skirt portions 4A are provided at an outer peripheral side of each of the films 4 to extend laterally from the adsorbent 2, wherein the dispersing openings 8 are formed between the skirt portions 4A to permit the fresh-keeping liquid to disperse from each side surfaces 2A of the adsorbent 2.

With this, the freshness-keeping liquid can gradually be dispersed from the side of the side surfaces 2A of the adsorbent 2 interposed between the films 4, 4 through the dispersing openings 8 between the skirt portions 4A to the head space in the food packing body 11, thus, the inside of the food packing body 11 can be filled with a gaseous atmosphere for keeping the freshness.

Further, since the skirt portion 4A of each of the films 4 extends outwardly from the upper or lower surface of the adsorbent 2, the skirt portion 4 can prevent the side surfaces 2A of the adsorbent 2 from contacting directly the food 10 even when the freshness-keeping device 1 contacts the food 10 in the food packing body 11, and in this case, only the skirt portions 4A of the films 4 contact the food 10, as shown in FIG. 4.

In particular, the extension dimension L of the skirt portions 4A is formed to have a larger dimension than the thickness T of the adsorbent 2 (L>T) as shown in FIG. 2. Accordingly, even when the edge of the skirt portions 4A contacts the food 10 and the edge is bent, the side surface 2A of the adsorbent 2 can be covered by the skirt portions 4A, whereby it is possible to prevent certainly the side surfaces 2A of the adsorbent 2 from contacting directly the food 10.

Accordingly, such a disadvantage that the freshness-keeping liquid in the adsorbent 2 is absorbed into the food 10 can be eliminated whereby the adsorption of the freshness-keeping liquid in the adsorbent 2 is preferably kept, and the gradually dispersing properties of the adsorbent 2 wherein the freshness-keeping liquid gradually disperses from the adsorbent 2, can be assured. Further, reduction in the article value due to the discoloration of the food 10 can be prevented. In this case also, the same effect as in the first embodiment, which is shown in Table 2 described hereinafter can be obtained.

Further, even in a case that the food 10 is western cakes containing much amount of fats and oils, such a disadvantage that the fats and oils in the food 10 are absorbed from the side surfaces 2A of the adsorbent 2 can be eliminated because a part of the food 10 never contacts directly the adsorbent 2 in the freshness-keeping device 1. With this, the adsorbent 2 in the freshness-keeping device 1 does not cause the discoloration due to the fats and oils in the food 10 and can keep preferably the outer appearance for a long period of time.

In this embodiment, accordingly, the direct contact of the adsorbent 2 in the freshness-keeping device 1 to the food 10 or the like can be prevented, and the service life of the freshness-keeping device 1 can be prolonged, and at the same time, the freshness of the food 10 can be kept stably for a long period of time without decreasing the article value. Further, the freshness-keeping device 1 performs such effect that the discoloration or the like of the adsorbent 2 can be suppressed and the quality of outer appearance of the freshness-keeping device 1 can be maintained to increase the article value.

Figure 5:
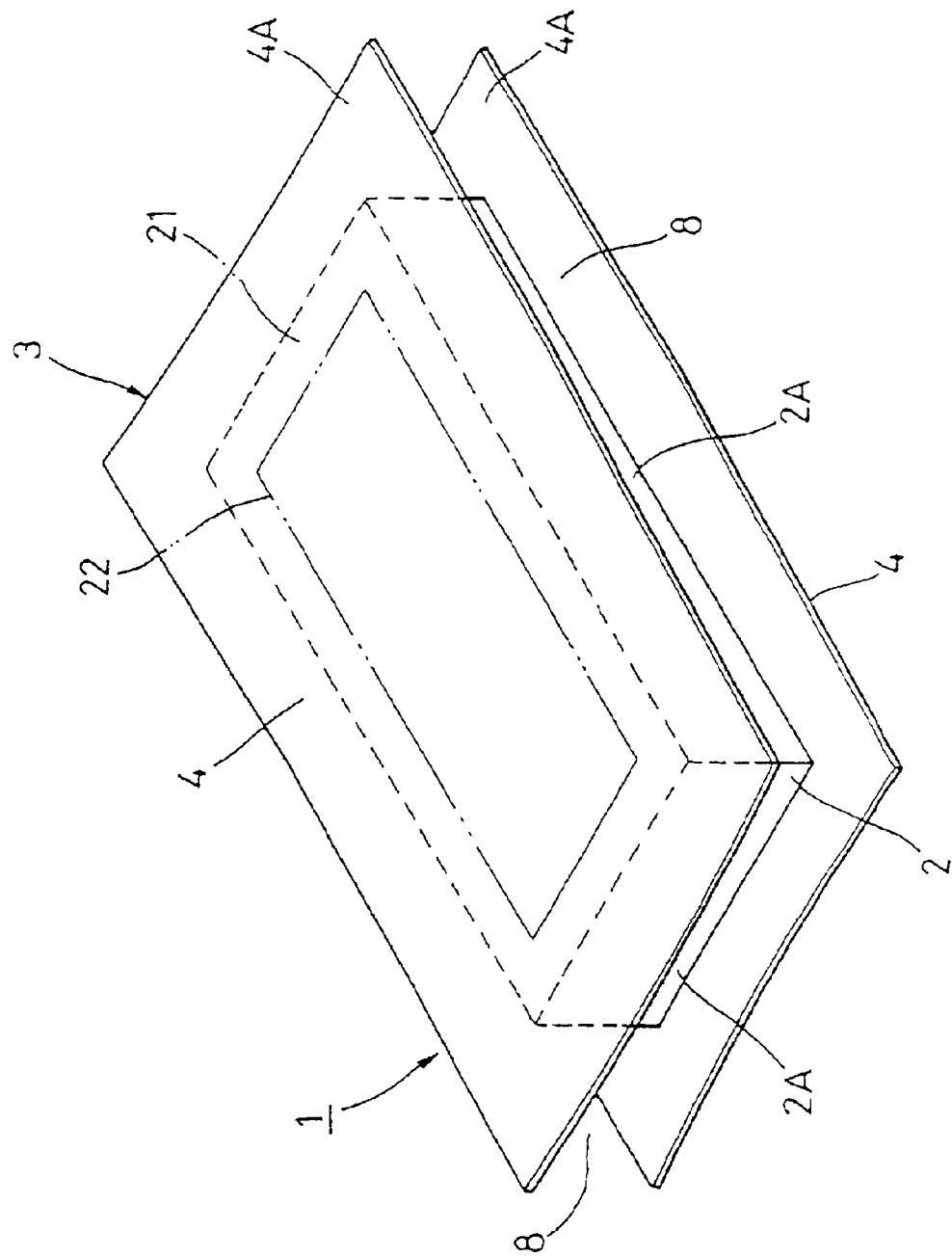
FIG. 5 is a perspective view showing the freshness-keeping device according to a second embodiment.

FIG. 5 shows a second embodiment of the present invention wherein the same reference numerals are applied to the same constituting elements as in the first embodiment, and description of these elements is omitted. The feature of this embodiment resides in that a bond area 21 for bonding the adsorbent 2 to the films 4 is formed to have a generally rectangular frame-like shape extending along circumferential sides of the adsorbent 2.

Here, the two films 4, 4 are respectively bonded to upper and lower surfaces of the adsorbent 2 in the bond area 21 by using means such as pasting, thermocompression bonding or the like which is safe to the food in the same manner as in the first embodiment. In this embodiment, however, an outer side portion of a rectangular frame-like line 22 indicated by a two-dotted chain line is the bond area 21 and an inner side portion of the frame line 22 is a non-bond area.

Thus, even in this embodiment having such structure, substantially the same function and effect as in the first embodiment can be obtained. In particular, however, in this embodiment, bonding operations for bonding the films 4 to the adsorbent 2 can effectively be conducted.

FIGS. 6 to 9 show a third embodiment of the present invention. The feature of this embodiment resides in that the cover covering the adsorbent from outside is comprised of two films having a rectangular shape; bond areas for bonding the films to each other are formed at corner portions of each of the films, and the adsorbent is held in a state incapable of drawing between the films by the presence of the bonding areas.

In Figures, reference numeral 31 designates a freshness-keeping device employed in this embodiment wherein the freshness-keeping device 31 comprises generally an adsorbent 32 described hereinafter and a cover 34 for covering the adsorbent 32 from outside, which will be described hereinafter.

Figure 7:
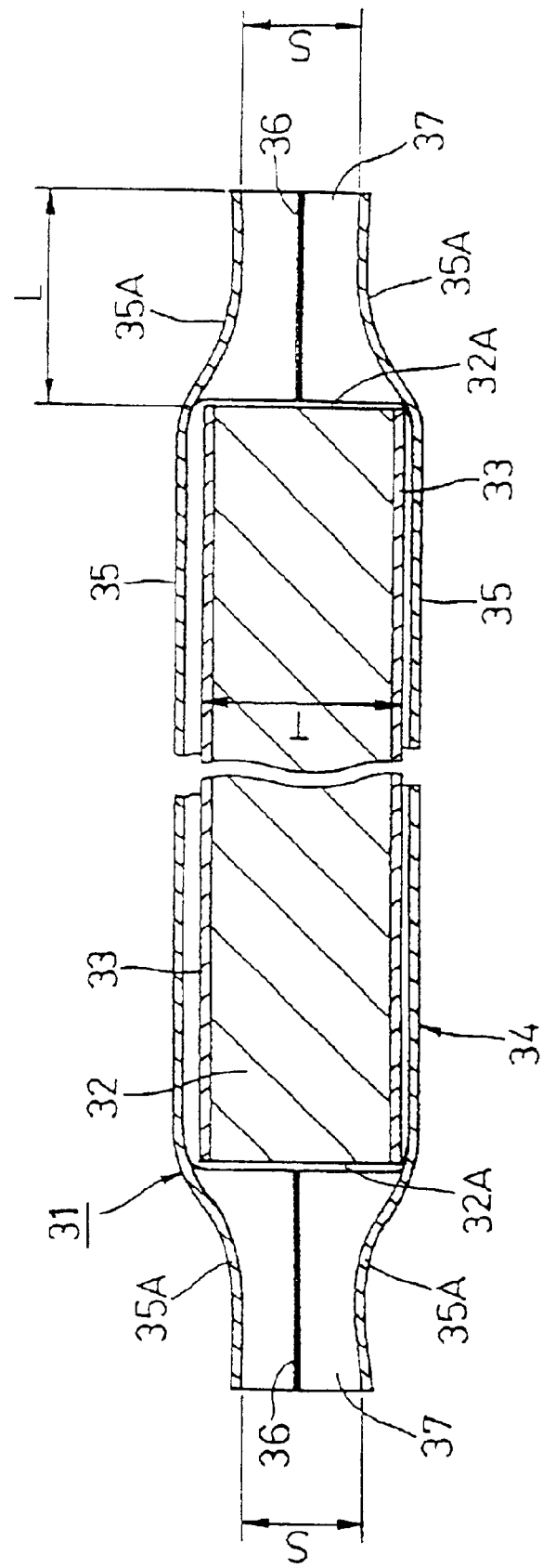
FIG. 7 is an enlarged cross-sectional view of the freshness-keeping device viewed from a direction of arrow marks VII—VII in FIG. 6.

Numeral 32 designates the adsorbent disposed in the cover 34 wherein the adsorbent 32 has substantially the same construction as the adsorbent 2 described in the first embodiment and the volatile freshness-keeping liquid is impregnated therein. However, covering layers 33, 33 are provided on upper and lower faces of the adsorbent 32 as shown in FIG. 7, and each of the covering layers 33 is constituted by the resinous film of three-layer structure in the same manner as the film 4 described in the first embodiment.

The covering layers 33, 33 have dimensions corresponding to the adsorbent 32 and cover the upper and lower surfaces of the adsorbent 32 whereby the upper and lower surfaces of the adsorbent 32 are provided with a high impermeability (high gas-barrier properties) to gas. The freshness-keeping liquid impregnated in the adsorbent 32 is permitted to gradually disperse outside from front, rear, left and right side surfaces 32A, 32A, . . . of the adsorbent 32 through dispersing openings 37 which are described later.

Numeral 34 designates the film cover covering the adsorbent 32 from an outer side. The cover 34 comprises two films 35, 35 covering the adsorbent 32 from both upper and lower sides and bond areas 36 described later.

Here, each of the films 35 is formed to be a thin rectangular sheet having larger dimensions than the adsorbent 32 by using a resinous film having high gas-barrier properties such as, for example, biaxially oriented polypropylene film (OPP film). An outer peripheral side of the film 35 extends as a skirt portion 35A in a lateral direction of the adsorbent 32, and the skirt portion 35A has four corner portions 35B, 35B, . . . .

Even in this case, the extension dimension L of the skirt portion 35A is about 4–6 mm, for example, and is formed to have a dimension larger than that of the thickness T of the adsorbent 32 (L>T) as shown in FIG. 7. With this, even when the edge of the skirt portion 35A is bent by the contact with the food or the like, the side surfaces 32 of the adsorbent 32 can be covered by the skirt portion 35A whereby it is possible to prevent certainly the side surfaces 32A of the adsorbent 32 from contacting directly the food or the like.

Further, the film 35 is formed to have a relatively thick dimension of about 30–70 μm for example, whereby a certain degree of rigidity is provided to the outer peripheral portion as the skirt portion 35A. Thus, upper and lower skirt portions 35A, 35A are prevented from coming to contact with each other due to water drops or moisture at the positions of the dispersing openings 37.

Figure 6:
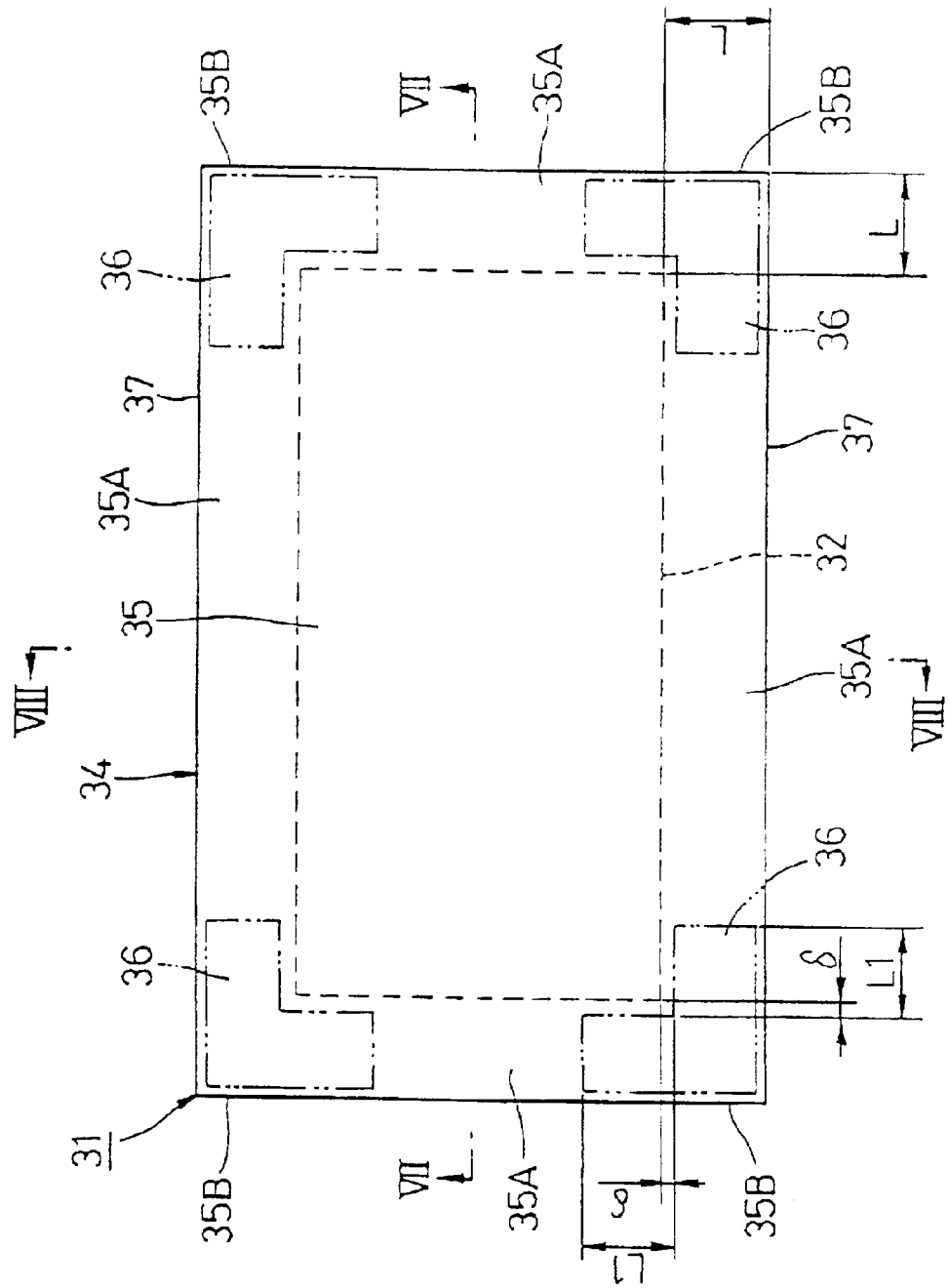
FIG. 6 is a front view showing the freshness-keeping device according to a third embodiment.

Numerals 36, 36, . . . designate the bond areas as thermally sealing portions located at each corner portion 35B of the films 35. Each of the bond areas 36 is formed to have a generally L-like shape by using means such as thermocompression bonding, and upper and lower corner portions 35b, 35B are bonded to each other as shown in FIG. 6. These bond areas 36 provide such structure that the adsorbent 32 is restricted between the upper and lower films 35, 35; the adsorbent 32 is held in a state incapable of drawing, and a dimension of openings is previously formed for the dispersing openings 37 which are described later.

Here, the bond areas 36 having a generally L-like shape are formed to have a drawing prevention allowance of a dimension L1 of about 4–6 mm for example. Further, a gap δ of about 1–3 mm is formed between the adsorbent 32 and each bond area 36 for example.

Numerals 37, 37, . . . designate the dispersing openings formed between the skirt portions 35 of the films 35. Each of the dispersing openings 37 is formed between the skirt portions 35A which are extended in a lateral direction of the adsorbent 32 and are apart from each other in upper and lower directions so that front, rear, left and right side surfaces 32A, 32A of the adsorbent 32 are communicated with outer air.

Figure 8:
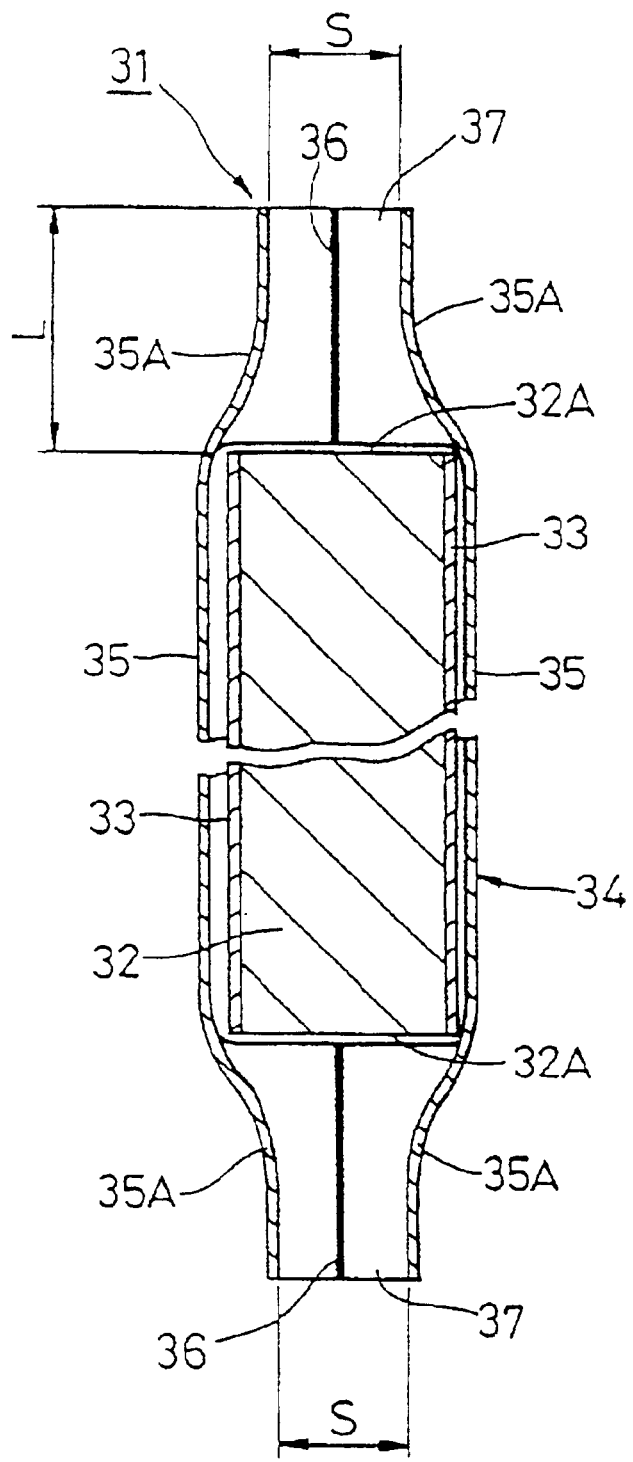
FIG. 8 is an enlarged cross-sectional view of the freshness-keeping device viewed from a direction of arrow marks VIII—VIII in FIG. 6.
Figure 9:
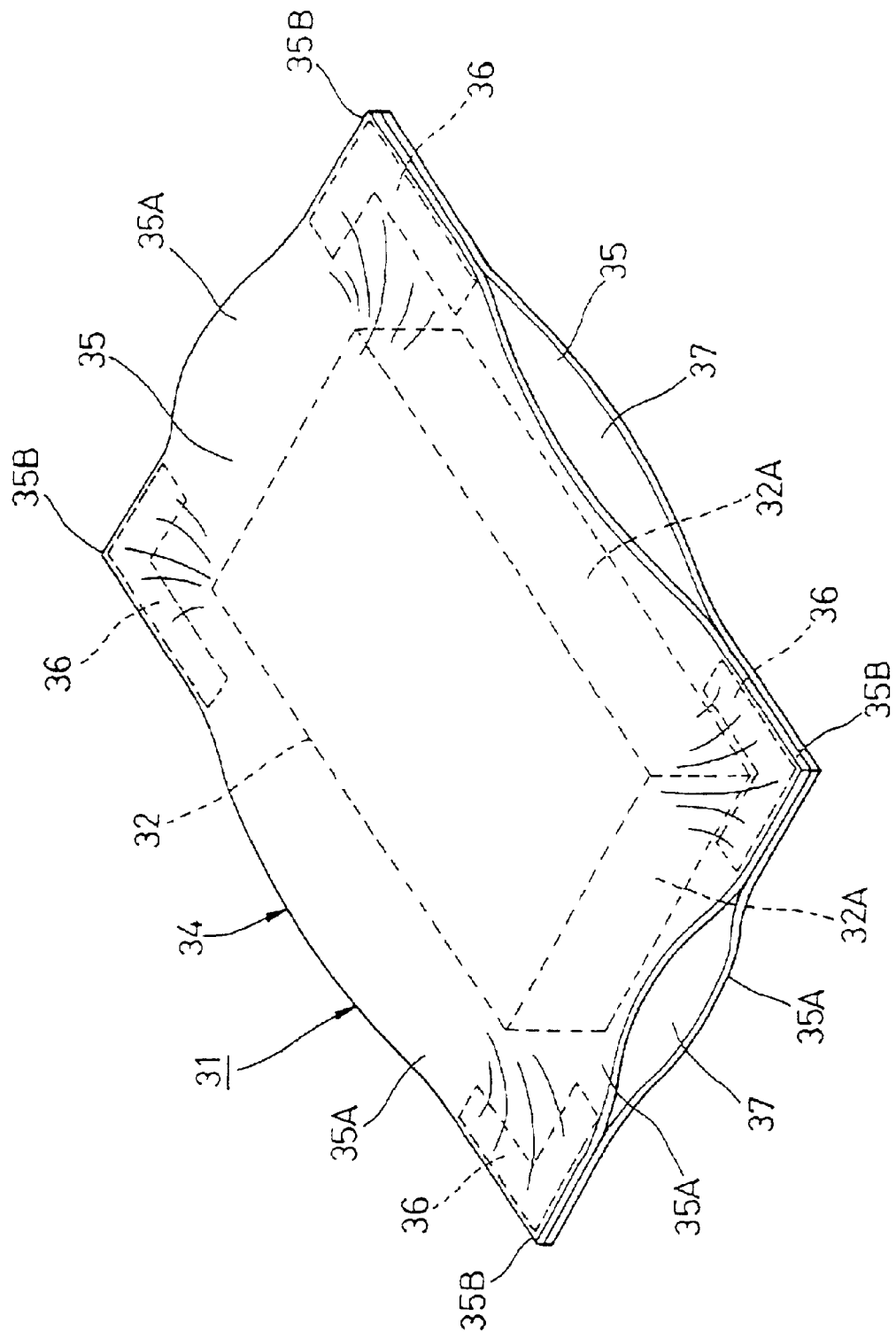
FIG. 9 is an enlarged perspective view of the freshness-keeping device in FIG. 6.

Namely, each of the dispersing openings 37 is constituted by a non-bond area which is located between the bond areas 36 in FIG. 6 between the skirt portions 35A of the upper and lower films 35, 35. These dispersing openings 37 are formed to have the dimension of opening S (for example, 1.5–2.5 mm, preferably 1.8 mm or more) as shown in FIGS. 7 and 8 whereby the freshness-keeping liquid impregnated in the adsorbent 32 is dispersed outside from each of the side surfaces 32A.

Thus, even in this embodiment having such construction, substantially the same function and effect as in the first embodiment can be obtained. In particular, in this embodiment, the adsorbent 32 can be restricted in a state of being received between the upper and lower films 35, 35 by the bond areas 36 formed at each corner portions 35B of the films 35 whereby the direct contact of the adsorbent 32 to the food or the like can preferably be prevented.

Further, four dispersing openings 37 can be formed between the skirt portions 35A of the films 35, and the freshness-keeping liquid in the adsorbent 32 can gradually be dispersed outside through these dispersing openings 37. Then, such effect as in the second embodiment shown in Table 2 described hereinafter can be obtained. Further, the surface area of the dispersing openings 37 can be changed properly depending on the shape and the size of the bond areas. With this, the dispersing rate of the freshness-keeping liquid can correctly be adjusted.

Figure 10:
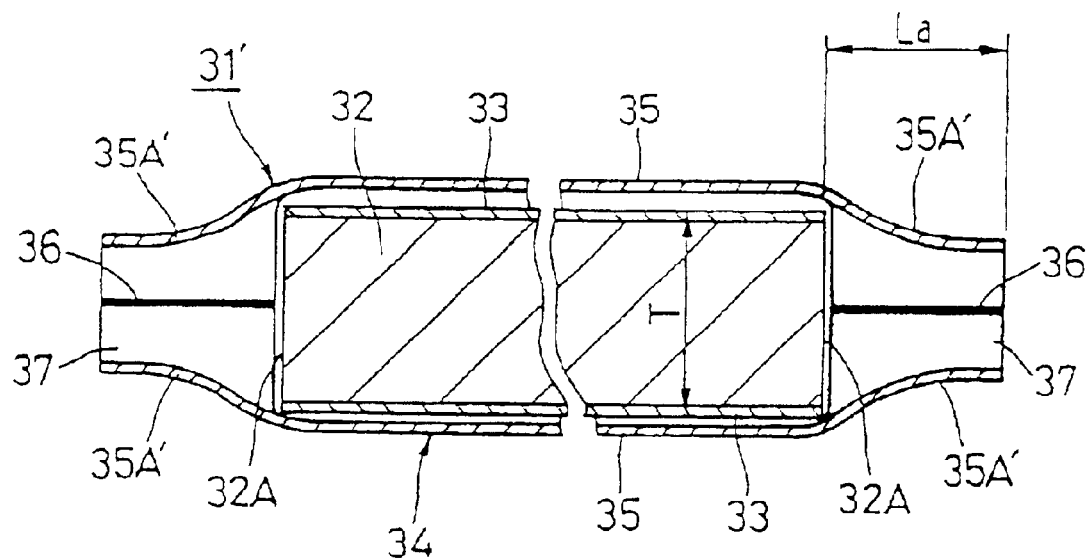
FIG. 10 is an enlarged cross-sectional view of the freshness-keeping device according to a first modified embodiment.

In the third embodiment, description has been made as to the extension dimension L of the skirt portions 35A being larger than the thickness T of the adsorbent 32 (L>T). However, the present invention is not restricted to this but the extension dimension La of skirt portions 35A' may be formed to be equal to the thickness T of the adsorbent 32 (La=T) as shown in FIG. 10, for example. In this case also, such effect as in embodiment 3 shown in Table 2 described hereinafter can be obtained.

Figure 11:
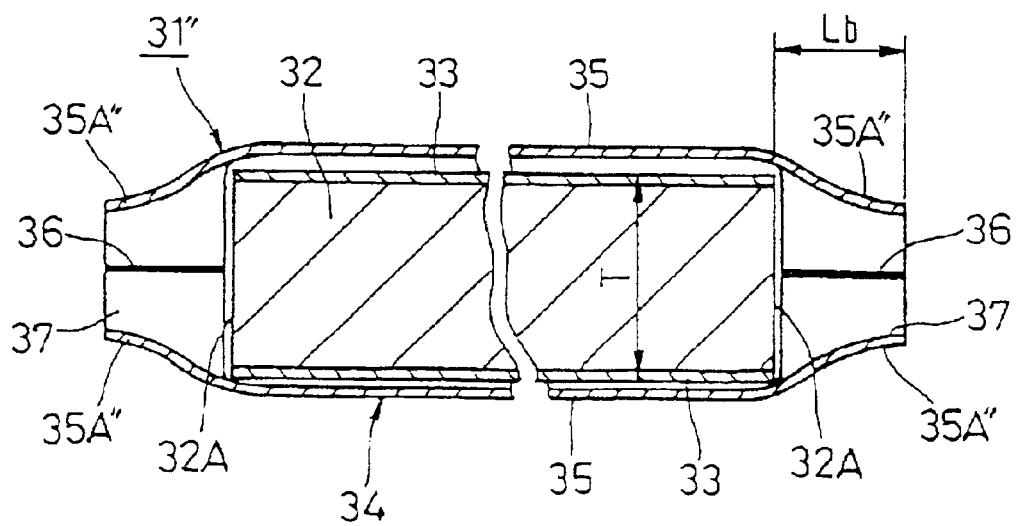
FIG. 11 is an enlarged cross-sectional view of the freshness-keeping device according to a second modified embodiment.

Further, as in a second modification shown in FIG. 11 for example, the extension dimension Lb of skirt portions 35A" may be formed to have a dimension smaller than that of the thickness T of the adsorbent 32 (Lb<T). In this case also, such effect as in the fourth embodiment shown in the Table 2 described hereinafter can be obtained.

Figure 12:
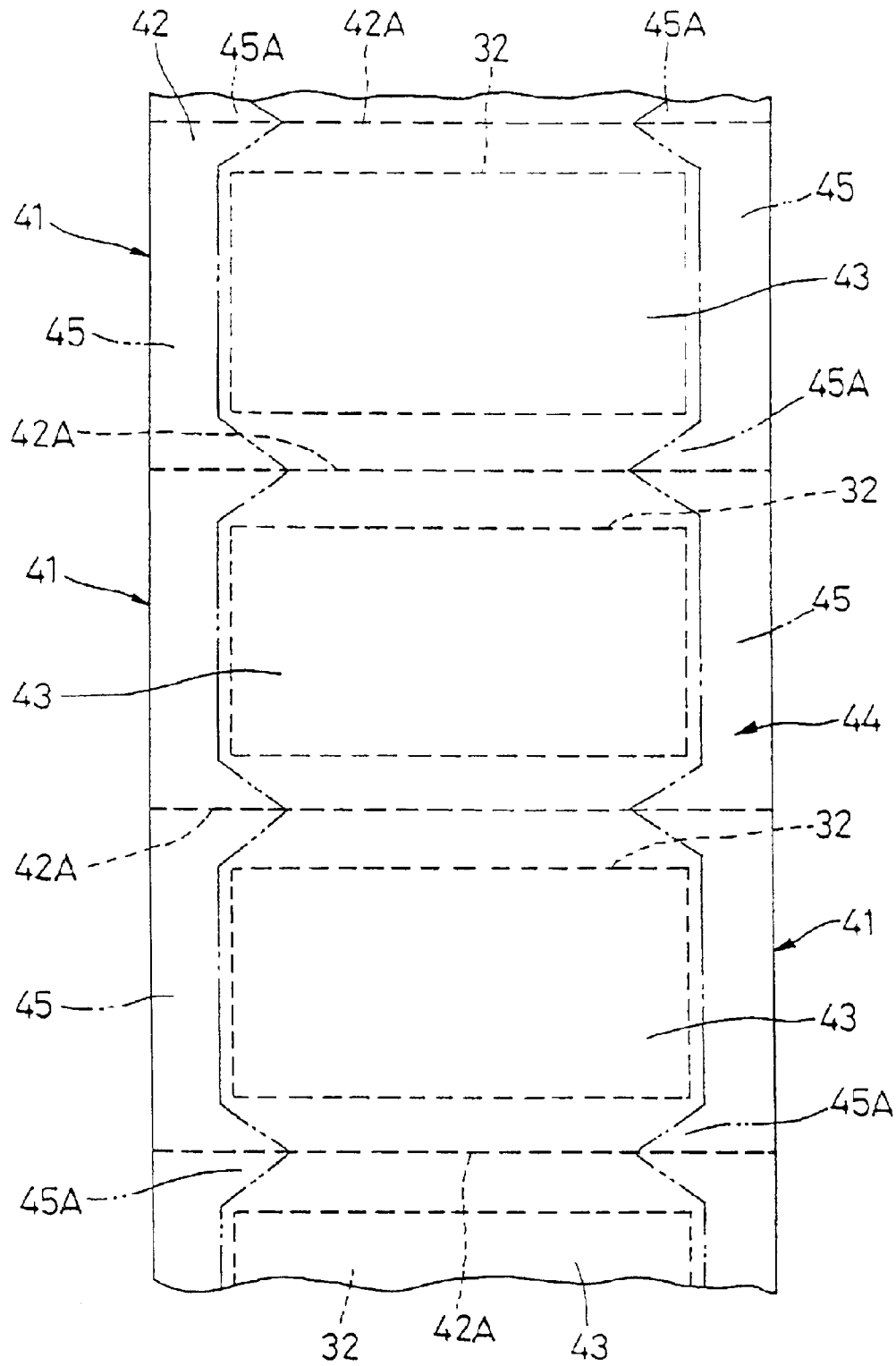
FIG. 12 is a front view showing the freshness-keeping device of continuously packing structure in a continuously packed state according to a fourth embodiment.
Figure 13:
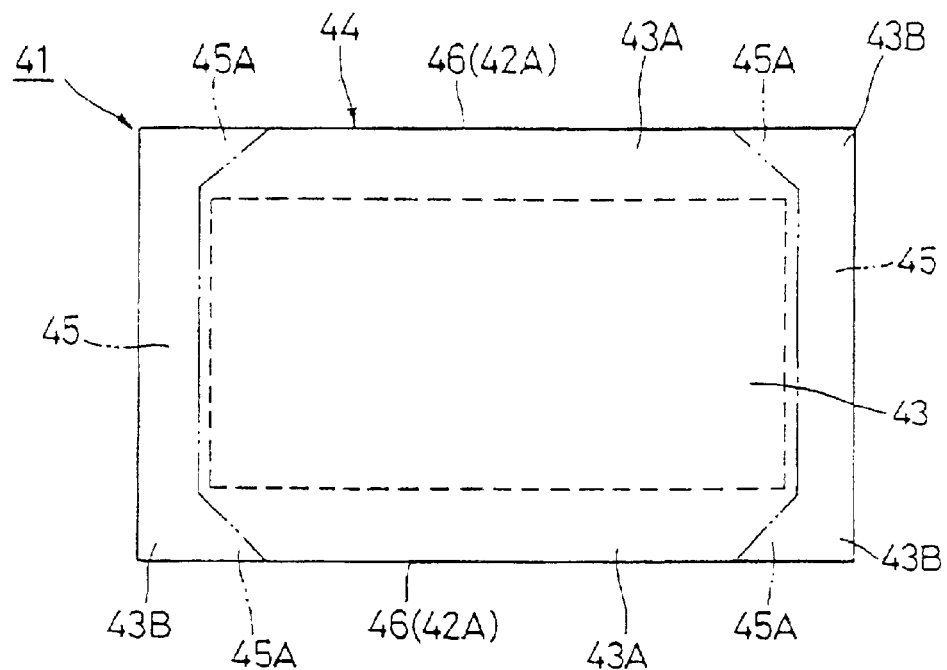
FIG. 13 is a front view showing the freshness-keeping device as a single unit in FIG. 12.

Next, FIGS. 12 and 13 show a fourth embodiment of the present invention wherein the same reference numerals designate the same constituting elements as those in the third embodiment, and description of these elements is omitted. The feature of this embodiment resides in a construction that adsorbents 32 of freshness-keeping devices 41 are packaged continuously by using elongated resinous films 42 extending in a strip form wherein both left and right sides are parallel to each other (hereinbelow, referred to as elongated films 42 ).

Here, in each of the freshness-keeping devices 41, the adsorbent 32 is accommodated in a cover 44 comprising two films 43 (only one film is shown) in the same manner as the third embodiment. Each of the films 43 has a rectangular shape wherein a skirt portion 43A and corner portions 43B are formed as shown in FIG. 13. However, each of the films 43 is so constructed that in a state of overlapping the two elongated films 43 (only one is shown) as in FIG. 12, bond areas 45, 45, . . . are formed continuously at both left and right sides.

In the films 43, cut lines 42A, 42A, . . . such as machined cut portions or discrete cut portions are formed with constant intervals so that each film 32 is cut off individually. With this, the adsorbents 32 are housed individually between the upper and lower films 43 (only one is shown) which are defined by cutting lines 42A of the elongated films 42. The elongated films 42 are formed by using the same resinous film material as the films 35 described in the third embodiment.

Each bond area 45 is constituted in substantially the same manner as the bond area 36 described in the third embodiment except that the bond area 45 extends continuously along a direction of the length of the elongated films 42. Further, drawing prevention areas 45A, 45A, . . . having a substantially triangular shape are formed in each bond area 45 at positions crossing the cutting lines 42A of the elongated films 42 whereby each of the drawing prevention areas 45A prevents the adsorbent 32 from drawing from dispersion openings 46 described hereinafter.

The dispersing openings 46 are formed at positions corresponding to the cut lines 42A when the films 43 are cut off from the elongated films 42 as shown in FIG. 13. At the dispersing openings 46, the films 43 are opened outwardly between left and right bond areas 45 (drawing prevention area 45A) whereby the freshness-keeping liquid in the adsorbent 32 is dispersed gradually outside.

Thus, even in this embodiment having such construction, substantially the same function and effect as in the first embodiment can be obtained. In this embodiment, in particular, it is possible to form a continuously packing structure for the freshness-keeping devices 41 by using the elongated films 42 to thereby improve workability in the manufacturing.

When the freshness-keeping devices 41 in a continuously packed state are used individually, the films 43 for each freshness-keeping device 41 are cut off from the elongated films 43 at the position of the cut line 42A whereby the dispersing opening 46 of the freshness-keeping device 41 are opened to the outside, and so-called virgin sealing properties can be provided.

Further, in this state, the adsorbent 32 can be restricted between upper and lower films 43 in a state of housing the adsorbent 32, by the drawing prevention areas 45A at the bond areas 45 formed at both left and right sides of the films 43 whereby it is possible to prevent preferably the adsorbent 32 from contacting directly the food or the like accommodated separately. Further, the surface area of the dispersing openings 46 can be changed by changing properly the shape and the size of the drawing prevention areas 45A whereby the dispersing rate of the freshness-keeping liquid can correctly be adjusted.

Further, continuously packing structure housing therein freshness-keeping devices 41 as shown in FIG. 12 has such advantage that the existing charging machine for charging freshness-keeping material can be used as it is in order to charge the material automatically in each food packaging body. Further, it is not always necessary to form cut lines 42A such as machined cut portions in the elongated films 42 but the elongated films 42 may be cut at constant intervals by using a cutter or the like.

In this case, marks for cut may be formed in the elongated films 42 instead of the cut lines 42A for example. With this, the positions of the marks for cutting can be read with a reading device so that the elongated films can correctly be cut away at the positions of the marks by using an automatic cutter or the like, and the automatically charging in the food packing body can repeatedly be continued.

Figure 14:
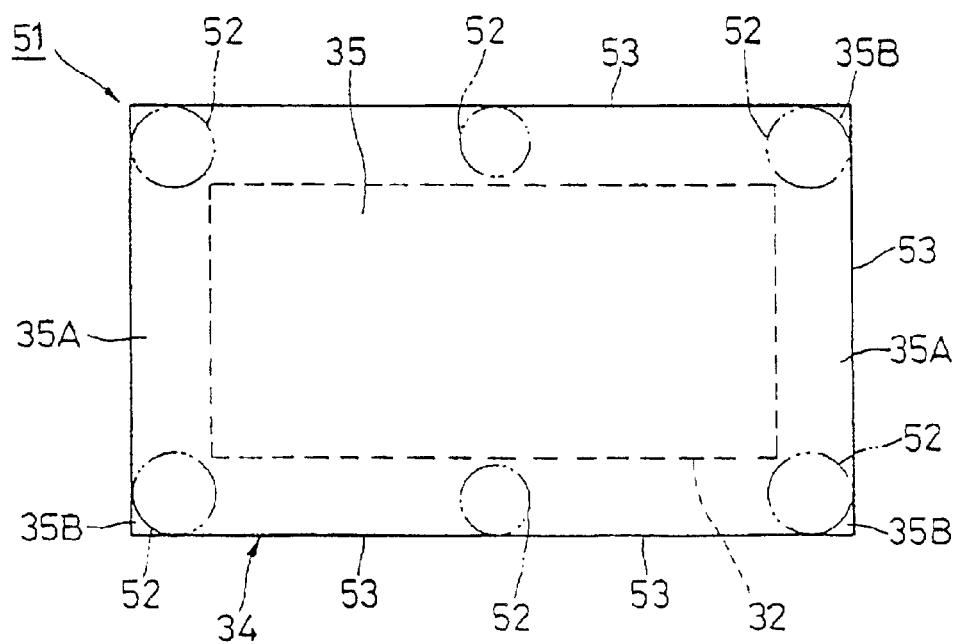
FIG. 14 is a front view showing the freshness-keeping device according to a fifth embodiment.

FIG. 14 shows a fifth embodiment of the present invention wherein the same reference numerals as in the third embodiment designate the same constituting elements, and therefore, description of these elements is omitted. The feature of this embodiment resides in that six bond areas 52, 52, . . . in total are formed in the freshness-keeping device 51.

The freshness-keeping device 51 comprises the adsorbent 32, the films 35 and so on in the same manner as the third embodiment wherein the bond areas 52, 52, . . . are formed respectively at corner portions 35B of the films 35. However, the freshness-keeping device 51 has bond areas 52 in an intermediate portion in the direction of the length of the films 35 to provide a structure for preventing the adsorbent 32 from drawing. Further, each of the bond areas 52 is formed as a circular press-bond area by using thermocompression bonding means for example.

The freshness-keeping device 51 has six dispersing openings 53, 53, . . . located between each bond areas 52 whereby the freshness-keeping liquid in the adsorbent 32 is permitted to disperse outside through each of the dispersing openings 53.

Thus, even in this embodiment having such construction, substantially the same function and effect as in the first embodiment can be obtained. However, in this embodiment, in particular, since the bond areas 52 are respectively formed in an intermediate portion in a direction of the length of the films 35 in addition to each corner portion 35B of the films 35, the drawal of the adsorbent 32 can certainly be prevented by the bond areas 52 in a state that the adsorbent 32 is housed between the upper and lower films 35.

Examples embodying the embodiments of the present invention will be described with reference to the below-mentioned Table 2.

TABLE 2

| | | Evaluation on wettability of food | Evaluation on long time preservation | Evaluation on color change |
|---|---|---|---|---|
| Freshness-keeping device | Comparative Example 1 | Getting wet by the own weight of food | Presence of mold | Entirely yellowing |
| | Example 1 | Getting wet by the application of an external force | Absence of mold | Slightly yellowing |
| | Example 2 | Not getting wet even though an external force was applied | Absence of mold | Not yellowing |
| | Example 3 | Getting wet by the application of an external force | Absence of mold | Slightly yellowing |
| | Example 4 | Getting wet by the application of an external force | Absence of mold | Slightly yellowing |

In the food packing body 11 shown in FIG. 4, a sponge cake as food to be preserved (weight: 200 g and water activity: 0.864) was sealed together with the freshness-keeping device. Then, the following test was conducted. As the food packing body 11, a packing body obtained by laminating a biaxially oriented polypropylene film OP of 30 $\mu$m and a non-oriented polypropylene film CP of 30 $\mu$m is used.

In Comparative Example, a freshness-keeping device manufactured by a conventional technique which is substantially the same as disclosed in, for example, JP-A-9-140363 was used. Namely, the freshness-keeping device of Comparative Example has such structure comprising only the adsorbent without using a cover and so on.

As a freshness-keeping device according to Example 1, the freshness-keeping device 1 according to the first embodiment shown in FIG. 1 or FIG. 3 is used wherein the weight of the adsorbent 2 is 2.0 g (length: 50 mm, width: 30 mm, thickness: 2 mm), and 2 g of freshness-keeping liquid shown in Table 1 is impregnated. Further, the extension dimension L of the skirt portion 4A is 5 mm so as to be larger in dimension than the thickness T of the adsorbent 2 (L>T).

As a freshness-keeping device in Example 2, the freshness-keeping device 31 according to the third embodiment shown in FIGS. 6 to 9 is used wherein the weight of the adsorbent 32 is 2.0 g in the same manner as that of the first embodiment, and 2 g of the freshness-keeping liquid is impregnated similarly. Further, the extension dimension L of the skirt portion 35A is 5 mm so as to be larger in dimension than the thickness T of the adsorbent 32 (L>T).

On the other hand, as a freshness-keeping device in Example 3, the freshness-keeping device 31' according to the first modified embodiment shown in FIG. 10 is used. This is the same as that of Example 2 except that the extension dimension La of the skirt portion 35A' is equal to the thickness T of the adsorbent 32 (La=T).

Further, as a freshness-keeping device in Example 4, the freshness-keeping device 31" according to the second modified embodiment shown in FIG. 11 is used. This is the same as that of Example 2 except that the extension dimension Lb of the skirt portion 35A" is smaller than the thickness T of the adsorbent 32 (Lb<T).

In evaluation on the wettability of the food, examination was made in a state that the food was preserved for a month in the food packing body 11. As a result, it was found that in Comparative Example, the food got wet by its own weight.

On the other hand, in the device according to Example 1, it was found that the food did not get wet by its own weight although it got wet in the application of a load of 500 g as an external force.

Further, in the device according to Example 2, it was found that the food did not get wet even by the application of a load of 500 g as an external force. On the other hand, the devices according to Examples 3 and 4, it was found that the food did not get wet by its own weight although it got wet in the application of a load of 500 g as an external force.

As a result of conducting evaluation on a long term preservation of three months, it was found that there occurred mold in Comparative Example, but there was no occurrence of mold and so on in Examples 1–4.

In evaluation on discoloration to yellowing, examination was conducted as to whether or not yellowing was found in the adsorbent due to the fats and oils in the food after it was reserved for one month. As a result, it was found that yellowing was found on the entire surface in Comparative Example, whereas in Example 1, the degree of yellowing was small although slight yellowing was found.

In Example 2, it was found that no yellowing took place at all. In Examples 3 and 4, it was found that the degree of yellowing was small although slight yellowing took place.

Figure 15:
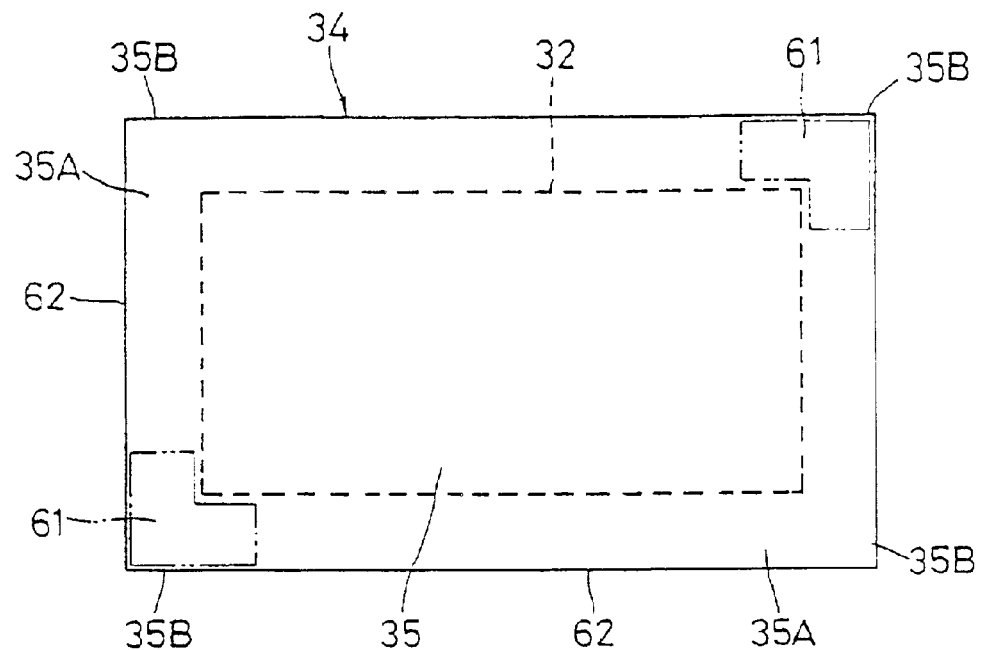
FIG. 15 is a front view of the freshness-keeping device according to a third modified embodiment.

In the third embodiment, description is made so that the bond areas 36 are respectively formed at corner portions 35B of the films 35. However, the present invention is not restricted to this, but the present invention may be so constructed that as in the third modified embodiment shown in FIG. 15, bond areas 61, 61 are formed at only two corner portions 35B, 35B on a diagonal line among corner portions 35B in the rectangular films 35, and two dispersing openings 62, 62 are formed between the bond areas 61.

Figure 16:
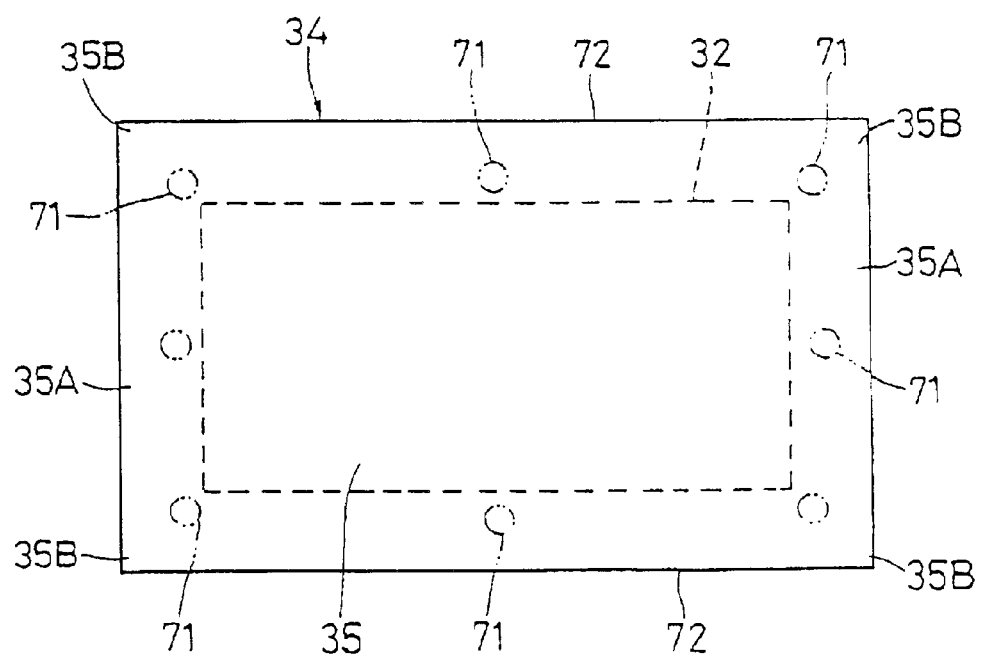
FIG. 16 is a front view of the freshness-keeping device according to a fourth modified embodiment.

Further, as in the fourth modified embodiment shown in FIG. 16, eight bond areas 71, 71, . . . may be formed, and dispersing openings 72, 72, . . . may be formed at non-bond areas located between the bond areas 71. In this case, the number of bond areas 71 may be 8 or more.

Figure 17:
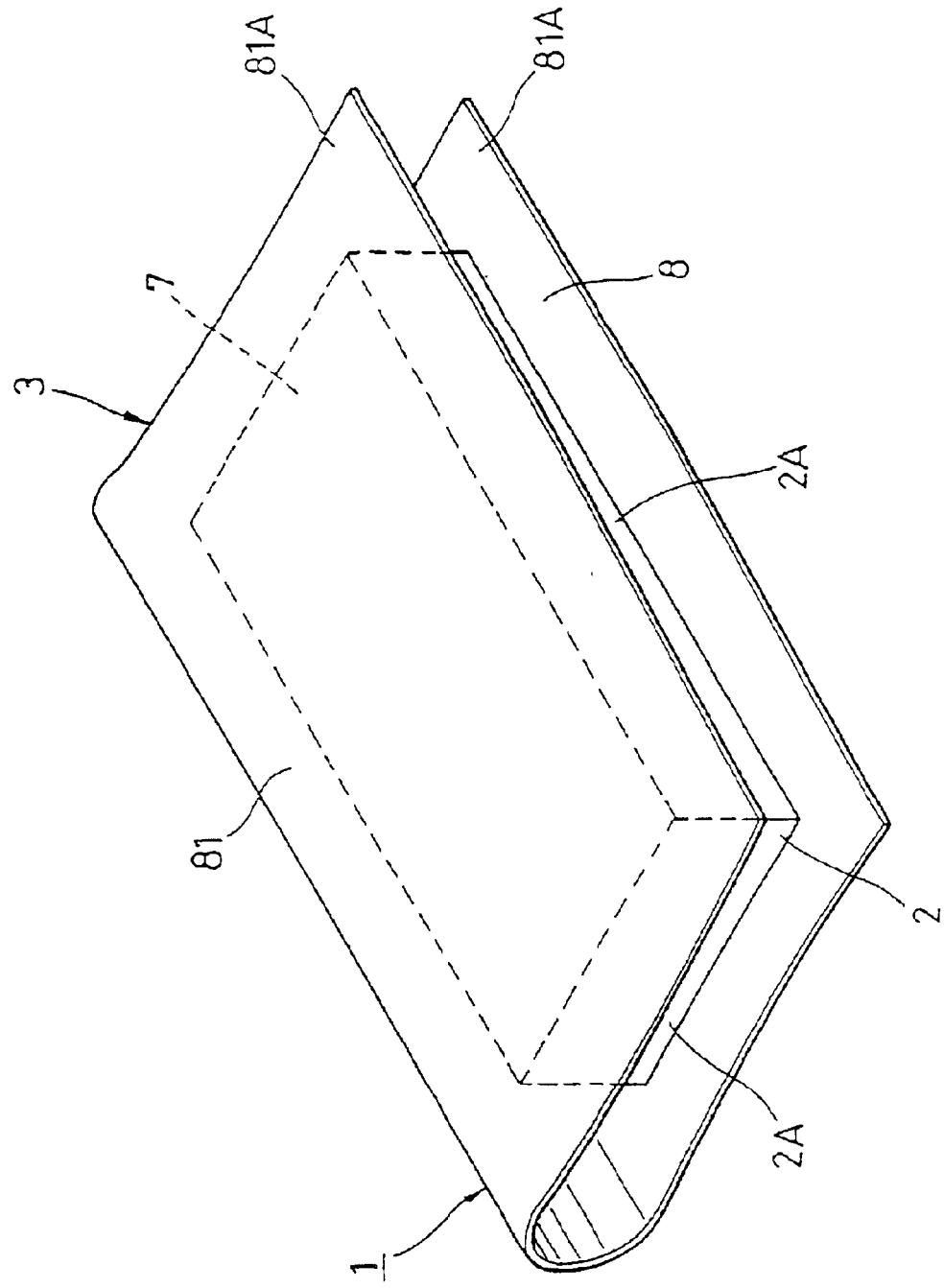
FIG. 17 is a perspective view of the freshness-keeping device according to a fifth modified embodiment.

Further, in the first embodiment, description is so made that the cover 3 covering the adsorbent 2 from outer sides is formed of two films 4, 4. However, instead of this, the construction as in the fourth modified embodiment shown in FIG. 17 may be used. Namely, the cover 3 is formed by using a single film 81 and it interposes the adsorbent 2 in a state that the film 81 is bent into a U-like shape so that skirt portions 81A, 81A which are apart vertically from each other are provided at an outer periphery of the film 81. This technique is applicable similarly to the second to fifth embodiments. On the other hand, in the third to fifth embodiments, description is made by exemplifying the case that the films 35 (elongated films 42) are formed by using the biaxially oriented polypropylene film. Instead of this, a resinous film having a high impermeability to gas such as, for example, non-oriented polypropylene, polyvinylidene chloride, polyvinyl alcohol, polyacrylonitrile, polyester, polyethylene, stretched nylon and so on may be used.

Further, in the same manner as the films 4 shown in FIG. 2 which is described in the first embodiment, the films 35 (elongated films 42 ) may be so formed as to have a three-layer structure comprising the film layer 5 having high gas-barrier properties, the coating layer 6 of a special resin and the film printing layer formed between the coating layer 6 and the film layer 5. In this case, the coating layers 33, 33 covering the upper and lower surfaces of the adsorbent 32 may be formed by using a resinous film of single layer having a high impermeability.

In the fourth embodiment, description is so made that the films 43 can be cut off from the elongated films 42. In the same manner, concerning the films 4 (35) described in the first, second, third and fifth embodiments, elongated resinous films may be used to provide such structure capable of cutting off.

In this case, it is not always necessary to form cutting lines such as machined cut portions in the elongated resinous films. For example, the elongated resinous films may be cut off with constant intervals by using a cutter or the like when the freshness-keeping device is used.

On the other hand, in the above-mentioned embodiments, description is made by exemplifying the case that the adsorbent 2 (32) and the films 4 (35, 43) have a rectangular shape. However, the shape is not always restricted to the rectangular shape. For example, the adsorbent may be formed to have a flat plate body or a round column body of a triangle shape, a square shape, a trapezoid or a polygonal shape such as a pentagonal shape and so on as far as the films have larger dimensions than the adsorbent.

Further, in the above-mentioned embodiments, description is made by exemplifying the freshness-keeping device for, in particular, food. However, the present invention is not limited to this, but may be used to keep the freshness of materials other than food, e.g., decorations of food such as bamboo leaves, persimmon leaves and so on, leather articles, articles made of wood or bamboo, articles made of grass or straw and so on.

INDUSTRIAL APPLICABILITY

As described above, according to the present invention, there is provided a freshness-keeping device for keeping the freshness of food or other material to be preserved, which comprises an adsorbent adsorbed with a volatile freshness-keeping liquid and a film cover made of a material having a high impermeability to gas of the freshness-keeping liquid, which has larger dimensions than the adsorbent to cover the adsorbent from the outside, wherein the cover has a skirt portion extending in a lateral direction of the adsorbent and a dispersing opening is formed in the skirt portion to permit the freshness-keeping liquid to gradually disperse outwardly from the adsorbent. Accordingly, the dispersion of the freshness-keeping liquid from a portion other than the dispersing opening to the outside can be suppressed by the film cover having a high impermeability to gas volatilizing from the freshness-keeping liquid; the direct contact of the adsorbent held inside to the food or the like can be prevented by the skirt portion, and the dispersing rate of the freshness-keeping liquid can be adjusted depending on the size of the dispersing opening whereby the dispersing rate can correctly be kept. Therefore, the freshness of the food or the like can be kept stably for a long period of time without reducing the article quality, and a reduction of outer appearance due to the discoloration of the adsorbent can be suppressed, thus, the article quality can be increased.

Further, in the present invention, the extension dimension L of the skirt portion extending in a lateral direction of the adsorbent is made larger than the thickness T of the adsorbent. Accordingly, even when the edge of the skirt portion of the film cover comes to contact with the food or the like whereby the edge is bent in a state that the freshness-keeping device and the food or the like are sealed in the food packing body, a side face of the adsorbent can be covered by the skirt portion, so that the direct contact of the adsorbent to the food or the like can certainly be prevented.

Further, according to the present invention, the adsorbent can be held by a single or two films constituting the cover in a state that the adsorbent is sandwiched, and the skirt portion of each of the films is extended from an upper or lower surface of the adsorbent outwardly with a space formed therebetween to thereby form the dispersing opening between them. Accordingly, the freshness-keeping liquid gradually disperses outside from a side surface side of the adsorbent sandwiched between the single or two films through the dispersing opening formed between the skirt portions, whereby it is possible to prevent the adsorbent from contacting directly the food or the like by the skirt portion.

In the present invention, on the other hand, the cover comprises a single or two films and a plurality of bond areas at which the skirt portion of each of the films bonded wherein the dispersing opening is constituted by a non-bond area which is located between the bond areas between the skirt portions of the film or films. Accordingly, the adsorbent can be restricted by the bond areas in a state that the adsorbent is sandwiched between the films so that the adsorbent is held at an inside position with respect to the skirt portion of each of the films. The freshness-keeping liquid in the adsorbent is permitted to gradually disperse outside through the dispersing opening between the films, and the direct contact of the adsorbent to the food or the like can preferably be prevented.

Further, in the present invention, bond areas can be formed at corner portions of the films having a polygonal shape, and at least two dispersing openings can be formed between bond areas at the skirt portion of the films. Accordingly, the freshness-keeping liquid is permitted to gradually disperse outside from a side surface side of the adsorbent through the dispersing openings, and the direct contact of the adsorbent to the food or the like can be prevented by the skirt portion.

Further, in the present invention, bond areas can continuously be formed at both left and right positions of the films having a rectangular shape whereby the formation of the bond areas is easy and workability in manufacturing can be improved.

Further, in the present invention, the film or films are made of an elongated strip-like resinous film and adsorbents are arranged with intervals inside the resinous film. Accordingly, a plurality of films can be formed by using the elongated resinous film. The adsorbent can be housed individually between films obtained by cutting the elongated resinous film at constant intervals. Thus, a freshness-keeping device of continuously packing structure can be provided.

Further, according to the present invention, the films constituting the cover for the freshness-keeping device can be formed by using the elongated resinous film, and the adsorbent can be housed individually in the films defined by cutting lines in the resinous film. Then, the freshness-keeping device can individually be used by cutting off the films at positions of cutting line in the elongated film whereby workability in manufacturing can be improved.

What is claimed is:

1. A freshness-keeping device for keeping the freshness of food or other material to be preserved, which comprises an adsorbent adsorbed with a volatile freshness-keeping liquid and a film cover made of a material having a high impermeability to gas of the freshness-keeping liquid, which has larger dimensions than the adsorbent to cover the adsorbent from the outside, wherein the cover has a skirt portion extending in a lateral direction of the adsorbent and a dispersing opening is formed at the skirt portion to permit the freshness-keeping liquid to gradually disperse outwardly from the adsorbent, wherein the cover comprises at least one film sandwiching the adsorbent, and wherein a bonding area is formed at the skirt portion by bonding opposing sandwiched surfaces of the at least one film.

2. The freshness-keeping device according to claim 1, wherein in the film cover, the extension dimension L of the skirt portion extending in a lateral direction of the adsorbent is larger than the thickness T of the adsorbent (L>T).

3. The freshness-keeping device according to claim 1, wherein the cover comprises a single or two films made of a material having a high impermeability each having larger dimensions than the adsorbent and having an outer periphery as the skirt portion extending in the lateral direction of the adsorbent in a state of sandwiching the adsorbent wherein the film or films secure the adsorbent by bonding upper and lower surfaces of the adsorbent in a state of sandwiching the adsorbent, and the skirt portions extend to an outer side of the adsorbent to provide a dispersing opening by being separated in upper and lower directions.

4. The freshness-keeping device according to claim 1, wherein the skirt portion includes a non-bond area between the opposing sandwiched surfaces of the at least one film.

5. A freshness-keeping device for keeping the freshness of food or other material to be preserved, which comprises an adsorbent adsorbed with a volatile freshness-keeping liquid and a film cover made of a material having a high impermeability to gas of the freshness-keeping liquid, which has larger dimensions than the adsorbent to cover the adsorbent from the outside, wherein the cover has a skirt portion extending in a lateral direction of the adsorbent and a dispersing opening is formed at the skirt portion to permit the freshness-keeping liquid to gradually disperse outwardly from the adsorbent, wherein the cover comprises a single or two films made of a material having a high impermeability each having larger dimensions than the adsorbent and having an outer periphery as the skirt portion extending in a lateral direction of the adsorbent in a state of sandwiching the adsorbent, and a plurality of bond areas formed at the skirt portions, which are formed by bonding the skirt portions whereby the adsorbent is restricted between the film or films and wherein the dispersing opening is constituted by a non-bond area which is located between the bond areas between the skirt portions of the film or films.

6. The freshness-keeping device according to claim 5, wherein the adsorbent has a polygonal flat sheet-like shape; the film or films have a shape corresponding to the shape of the adsorbent in which a plurality of corner portions are formed in the skirt portions and the bond areas are formed at at least two corner portions among the corner portions of the film or films.

7. The freshness-keeping device according to claim 5, wherein the film or films have a rectangular shape having left and right sides being parallel to each other and the bond areas are formed at both the left and right sides.

8. The freshness-keeping device according to claim 5, wherein the film or films are made of an elongated strip-like resinous film and adsorbents are arranged with intervals inside the elongated resinous film or films.

9. The freshness-keeping device according to claim 6, wherein the film or films are made of an elongated strip-like resinous film and adsorbents are arranged with intervals inside the elongated resinous film or films.

10. The freshness-keeping device according to claim 7, wherein the film or films are made of an elongated strip-like resinous film and adsorbents are arranged with intervals inside the elongated resinous film or films.

11. The freshness-keeping device according to claim 5, wherein the film or films are made of an elongated strip-like resinous film and a plurality of adsorbents are arranged with intervals on the elongated resinous film or films and a plurality of cut lines are formed in the elongated resinous film or films at positions between individual adsorbents to define the film or films.

12. The freshness-keeping device according to claim 6, wherein the film or films are made of an elongated strip-like resinous film and a plurality of adsorbents are arranged with intervals on the elongated resinous film or films and a plurality of cut lines are formed in the elongated resinous film or films at positions between individual adsorbents to define the film or films.

13. The freshness-keeping device according to claim 7, wherein the film or films are made of an elongated strip-like resinous film and a plurality of adsorbents are arranged with intervals on the elongated resinous film or films and a plurality of cut lines are formed in the elongated resinous film or films at positions between individual adsorbents to define the film or films.

14. A freshness-keeping device for keeping the freshness of food or other material to be preserved, which comprises an adsorbent adsorbed with a volatile freshness-keeping liquid and a film cover made of a material having a high impermeability to gas of the freshness-keeping liquid, which has larger dimensions than the adsorbent to cover the adsorbent from the outside, wherein the cover has a skirt portion extending in a lateral direction of the adsorbent and a dispersing opening is formed at the skirt portion to permit the freshness-keeping liquid to gradually disperse outwardly from the adsorbent, wherein the cover comprises a single or two films made of a material having a high impermeability each having larger dimensions than the adsorbent and having an outer periphery as the skirt portion extending in the lateral direction of the adsorbent in a state of sandwiching the adsorbent wherein the film or films secure the adsorbent by bonding upper and lower surfaces of the adsorbent in a state of sandwiching the adsorbent, and the skirt portions extend to an outer side of the adsorbent to provide a dispersing opening by being separated in upper and lower directions, and wherein the film or films are made of an elongated strip-like resinous film and adsorbents are arranged with intervals inside the elongated resinous film or films.

15. A freshness-keeping device for keeping the freshness of food or other material to be preserved, which comprises an adsorbent adsorbed with a volatile freshness-keeping liquid and a film cover made of a material having a high impermeability to gas of the freshness-keeping liquid, which has larger dimensions than the adsorbent to cover the adsorbent from the outside, wherein the cover has a skirt portion extending in a lateral direction of the adsorbent and a dispersing opening is formed at the skirt portion to permit the freshness-keeping liquid to gradually disperse outwardly from the adsorbent, wherein the cover comprises a single or two films made of a material having a high impermeability each having larger dimensions than the adsorbent and having an outer periphery as the skirt portion extending in the lateral direction of the adsorbent in a state of sandwiching the adsorbent wherein the film or films secure the adsorbent by bonding upper and lower surfaces of the adsorbent in a state of sandwiching the adsorbent, and the skirt portions extend to an outer side of the adsorbent to provide a dispersing opening by being separated in upper and lower directions, and wherein the film or films are made of an elongated strip-like resinous film and a plurality of adsorbents are arranged with intervals on the elongated resinous film or films and a plurality of cut lines are formed in the elongated resinous film or films at positions between individual adsorbents to define the film or films.

16. A freshness-keeping device for keeping the freshness of food or other material to be preserved, which comprises an adsorbent adsorbed with a volatile freshness-keeping liquid and a film cover made of a material having a high impermeability to gas of the freshness-keeping liquid, which has larger dimensions than the adsorbent to cover the adsorbent from the outside, wherein the cover has a skirt portion extending in a lateral direction of the adsorbent and a dispersing opening is formed at the skirt portion to permit the freshness-keeping liquid to gradually disperse outwardly from the adsorbent, wherein the film cover is joined to a surface of the adsorbent, and wherein the film cover is bonded to the surface of the adsorbent at a bond area that surrounds a non-bond area.

* * * * *